Dec. 4, 1934.  J. G. PAULIN  1,983,305
MEASURING INSTRUMENT
Filed Aug. 14, 1930
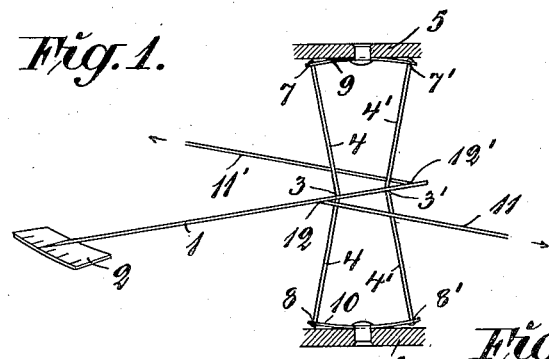
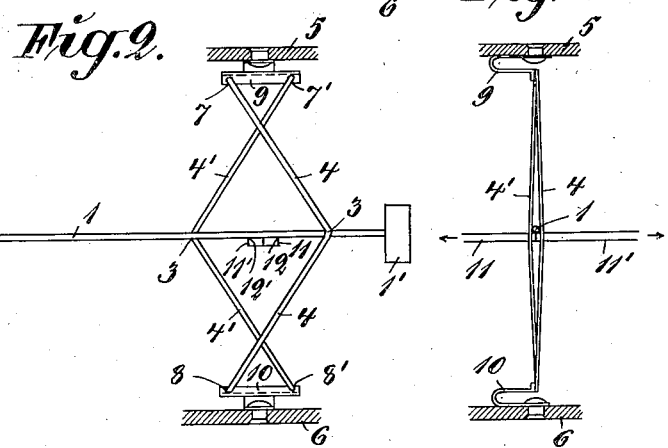
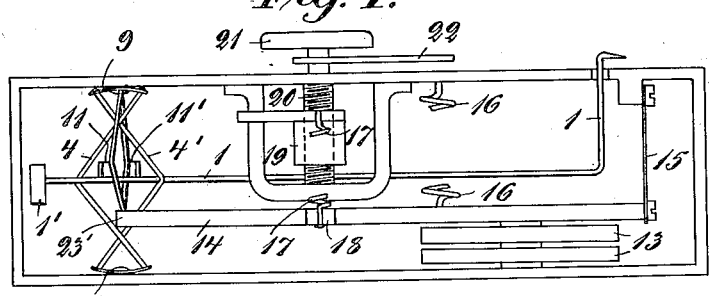
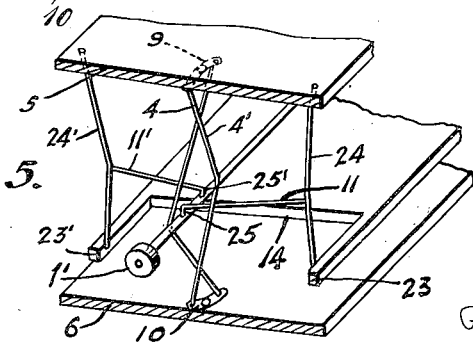
Inventor:
Josua gabriel Paulin
By
Pennie Davis Marvin & Edmonds
attorney Patented Dec. 4, 1934

1,983,305

UNITED STATES PATENT OFFICE 1,983,305

MEASURING INSTRUMENT

Josua Gabriel Paulin, Eskilstuna, Sweden

Application August 14, 1930, Serial No. 475,152
In Sweden August 17, 1929

5 Claims. (Cl. 73—4)

The present invention refers to measuring instruments and more particularly to means for rotatably mounting movable parts of such instruments.

It is previously known, in sensitive measuring instruments or the like, to eliminate the bearing friction at the movable part or parts, by way of example the pointer system, by substituting a suspension means, for instance consisting of springs, for the journal bearing of the movable part, said suspension means yielding elastically and allowing frictionless movement of the movable part. Through this arrangement it is possible considerably to increase the sensitivity of the instrument and decrease the measuring errors. A disadvantageous feature of the known arrangements of this kind is, however, that the part, which is elastically supported or mounted, is yieldable also laterally, i. e. in a direction perpendicular to the axis of rotation, so that, when the instrument occupies an inclined position, the movable part will be displaced from its normal position on account of its own weight and of the yielding of the suspension means in a sidewise direction. According to the present invention this disadvantageous feature is avoided thereby, that the movable part, by way of example the pointer, is suspended by two band systems or the like stretched in two directions approximately perpendicular to each other, the pointer or the like being joined to the two band systems in such a manner as to be subjected to opposite turning moments by the action of said band systems one of which is stretched in a direction substantially parallel with the axis of rotation while the other band system serves to transmit the force of movement to be measured to the pointer.

The invention will be more closely described with reference to the accompanying drawing showing some different embodiments of the invention.

Figure 1 is a perspective view showing diagrammatically a simple embodiment of the invention.

Figures 2 and 3 are a side view and a view looking in the direction of the suspended pointer, respectively, showing another embodiment of the invention.

Figure 4 is a side view showing an application of the invention to an aneroid barometer.

Figure 5 is a side view looking in the direction of the pointer showing part of the arrangement according to Figure 4.

In the arrangement according to Figure 1 the pointer 1 is connected to two bands, filaments or other flexible members 4, 4' stretched symmetrically in relation to the axis of rotation of the pointer, the points of connection 3, 3' on the pointer being located at opposite sides of the axis of rotation of the pointer and at the same distance from said axis and, on the other hand, forming substantially the middle points of the bands. The point of the pointer plays over a fixed scale 2. The band system 4, 4' is stretched between two fastenings 5, 6, in the frame and provides the frictionless bearing for the pointer. Each band is stretched between mutually opposite free ends 7, 8 and 7', 8' respectively of two leaf springs, which at their centres are riveted to the fastenings 5, 6. If the pointer carried by the band system were left to itself it would evidently set itself in the plane through the four fixing points 7, 7', 8, 8' of the supporting band system. The pointer is, however, kept turned from this position by a band system 11, 11' stretched substantially perpendicularly to the supporting band system 4, 4'. The two bands 11, 11' are fastened to the pointer at points 12, 12' located at both sides of and at the same distance from the axis of rotation of the pointer and are stretched in mutually opposite directions. The bands 11, 11' serve the purpose of transmitting to the pointer movements to be measured or caused by forces to be measured. Through the turning of the pointer out of the position which the same on account of its connection with the supporting band system strives to occupy, the supporting band system has been subjected to a twist, on account of which said band system exercises a turning moment opposed to the moment exercised by the motion transmitting band system 11, 11'.

In the embodiment according to Figure 1 the angle of twist of the band system is relatively small. A greater sensitivity of the instrument may, however, be obtained by turning the pointer nearly 180° from that position which the same on account of the suspension in the supporting band systems strives to occupy. The pointer will then be near the position of unstable equilibrium corresponding to a turning of the pointer of 180°, i. e. corresponding to a twist of the bifilar supporting band system of 180°. In this position of unstable equilibrium the two bands 4, 4' would evidently lie in the same plane crossing each other at two points. The angle of twist of the supporting band system should, however, be so much less than 180° that the two bands 4, 4' will not come into contact with one another, neither in the zero-position of the pointer nor upon a deflexion of the same. In the embodiment according to Figures 2, 3 the two leaf springs 9, 10 are bent in U-shape, one leg being riveted to the frame and the other forming the fastenings for the band system. The pointer is provided with a counter-weight 1' disposed at the rear end of the same.

Figures 4 and 5 show the arrangement according to Figures 2 and 3 applied to an aneroid barometer adapted to be read off according to the zero method, the pointer 1 serving as a tendency pointer and having for its object to show the direction in which the zero setting of the diaphragm of the instrument should be carried out at the reading off. The barometer is provided with two diaphragm boxes 13, the movements of the diaphragms of which under the influence of the variations of the atmospheric pressure are transmitted to the tendency pointer 1 through the intermedium of a lever 14 to which the center point of the upper diaphragm is connected near the point where the lever is supported. The point of support is represented by the right end of the lever (Figure 4), at which the lever is suspended in the frame of the instrument by means of a flexible band 15. Said band is kept permanently stretched by an adjustable spring system acting at the other side of the fastening of the diaphragm. Said spring system consists of a comparatively rigid helical spring 16 having substantially constant tension and being fixed between the lever and the frame, and also of two helical springs 17 with adjustable tension, which springs act on the lever a little further away from the diaphragm at the ends of laterally projecting arms 18. The helical springs 17 are at their other ends fastened to a nut 19 threaded onto a micrometer-screw 20 journalled in the frame said nut being guided in the frame in such a manner as to prevent rotation thereof upon rotation of the screw. Upon turning the micrometer-screw by means of a zero setting handle 21 the nut may be raised or lowered without being turned, the tensions of the helical springs then being varied. At the reading off of the instrument the tension of the springs 17 is adjusted by means of the zero setting handle 21 in such a manner, that the lever 14 occupies a certain definite middle position, the atmospheric pressure prevailing at the moment being thus balanced by the tension in the system of helical springs. The turning of the micrometer-screw between two consecutive zero readings is evidently proportional to the change in atmospheric pressure in the interval between the readings, and the prevailing atmospheric pressure may thus be read off for instance on a fixed scale which may be provided on the upper side of the frame.

The correct setting of the lever 14 and consequently of the diaphragm in the zero or middle position is carried out with the aid of the tendency pointer 1 to which the movements of the diaphragm are transmitted through the intermedium of the lever 14. The free end of the lever is shaped as a fork, the legs 23, 23' of which project at each side of the band or filament system 4, 4' supporting the tendency pointer 1. Bands 24, 24' bent at an angle are stretched between the ends of said legs 23, 23' and the frame, each of the bands 11, 11' being connected by one end to the point of the angle of one of the said bands 24, 24' respectively, and by its other end to a pin 25 or 25', respectively, extending upwardly from the pointer 1, said pins 25, 25' being arranged symmetrically with respect to the centre of rotation of the pointer.

If the atmospheric pressure should rise after the pointer has been set in the zero position, the free end of the lever 14 will drop, the bands 24, 24' will be slightly straightened out and the bands 11, 11' pulled outwards, the angle of twist of the carrying band system 4, 4' further nearing 180° and the tendency pointer 1 thus deflecting in the direction towards its position of unstable equilibrium in the plane through the points 7, 7', 8, 8'. If instead the atmospheric pressure should fall, the free end of the lever 14 will rise, the angle points formed by the bands 24, 24' will be pulled inwards by the bands 11, 11' on account of the twisting moment exerted on the pointer by the band system 4, 4', the tendency pointer then deflecting somewhat in the direction from its position of unstable equilibrium.

By the described elastic suspension means composed of two band systems extending substantially perpendicularly to each other, the tendency of the suspended pointer to yield in lateral direction is eliminated as the movement-transmitting band system affords efficient resistance against such yielding or lag of the pointer system. This system gets complete stability and moves with the same precision as if it were supported on well made pivots or journals, the bearing friction being at the same time completely eliminated. The arrangement is, of course, especially suitable for such instruments in which the pointer system makes only comparatively small deflections, i. e. in the first place in instruments built for reading off according to the zero method.

Instead of arranging springy fastenings at both ends of the supporting band system 4, 4' one may, if desired, make only one of the fastenings springy and secure the band system at the other end in a stiff fastening, whereby, however, the sensitivity is decreased.

I claim:

1. An instrument for measuring variable forces comprising in combination, two stationary fixtures, a first system of flexible members stretched between said fixtures, a rotary member, two parts the distance between which is variable under and by the influence of the forces to be measured, a second system of flexible members connecting said parts and extending substantially perpendicularly to the direction of stretching of the first system, said rotary member in suspended position being connected with both of said systems in such a manner as to cause the two systems to exert opposite turning moments upon the rotary member about an axis of rotation substantially parallel with the direction of stretching of the first system.

2. An instrument for measuring variable forces comprising in combination, two stationary fixtures, a first system of flexible members stretched between said fixtures, a rotary member connected with said system of flexible members so as to provide an elastic suspension thereof allowing of rotation about an axis substantially parallel with the direction of stretching of said first system, two parts the distance between which is variable under and by the influence of the forces to be measured, a second system of flexible members extending substantially perpendicularly to the direction of stretching of the first system, and means including the second band system for connecting the rotary member operatively with the said parts.

3. An instrument for measuring variable forces comprising in combination, two stationary fixtures, a first system of flexible members extending between said fixtures, yielding members connecting said flexible members to said stationary fixtures, a rotary member, two parts the distance between which is variable under and by the influence of the forces to be measured, a second system of flexible members connecting said parts and extending substantially perpendicularly to the direction of stretching of the first system, said rotary member in suspended position being connected with both of said systems in such a manner as to cause the two systems to exert opposite turning moments upon the rotary member about an axis of rotation substantially parallel with the direction of stretching of the first system.

4. An instrument as claimed in claim 1, characterized in that the said first system of flexible members is kept in twisted condition by the action of the second system of flexible members upon the rotary member.

5. An instrument as claimed in claim 1, characterized in that the said first system of flexible members consists of two bands the securing points of which at the two stationary fixtures are disposed in the same plane, said band systems being twisted nearly 180°.

JOSUA GABRIEL PAULIN.